(12) United States Patent
Kuo

(10) Patent No.: US 6,754,726 B1
(45) Date of Patent: Jun. 22, 2004

(54) VERSATILE MEMORY CHIP PROGRAMMING DEVICE AND METHOD

(75) Inventor: Jia Shiung Kuo, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 10/385,883

(22) Filed: Mar. 11, 2003

(51) Int. Cl.[7] .............................................. G06F 13/00
(52) U.S. Cl. .......................... 710/8; 710/305; 711/100; 711/170; 713/1
(58) Field of Search ..................... 710/8–15, 305–313; 711/100–105, 170; 713/1–2, 100

(56) References Cited

U.S. PATENT DOCUMENTS

| | | | |
|---|---|---|---|
| 5,553,144 A | * | 9/1996 | Almquist et al. ........... 713/100 |
| 5,978,862 A | * | 11/1999 | Kou et al. .................... 710/14 |
| 6,496,906 B1 | * | 12/2002 | Novak et al. ............... 711/154 |
| 6,557,065 B1 | * | 4/2003 | Peleg et al. ................. 710/300 |
| 6,594,717 B2 | * | 7/2003 | Rasmussen et al. ........ 710/100 |
| 6,636,946 B2 | * | 10/2003 | Jeddeloh ..................... 711/138 |

* cited by examiner

Primary Examiner—Christopher B. Shin
(74) Attorney, Agent, or Firm—Fulbright & Jaworski LLP

(57) ABSTRACT

A versatile memory chip programming device for memory chips is proposed, which is capable of writing data by way of an arbitrary type of I/O control chip, such as Southbridge chip, into a memory chip, such as a BIOS (Basic Input/Output System) chip used in a personal computer (PC). The proposed memory chip programming device is characterized by that the particular type of the Southbridge chip can be automatically detected to thereby set the write control module to operate in the corresponding mode that is compatible to the particular type of the Southbridge chip being currently coupled to the memory chip. This feature allows one single unit of memory chip programming device to be compatible to various types of Southbridge chips for BIOS upgrades so that BIOS upgrades can be made more cost-effective to implement than prior art.

8 Claims, 3 Drawing Sheets

Memory Chip Programming Device of the Invention

| PCI Device ID of Existing Southbridge Chips | |
|---|---|
| # Define VX_DEVID | 0x7030 |
| # Define MTXC_DEVID | 0x7100 |
| # Define PIIX3_DEVID | 0x7000 |
| # Define PIIX4_DEVID | 0x7110 |
| # Define PIIX4_DEVID_BANST | 0x7198 |
| # Define PAC_DEVID | 0x7190 |
| # Define PAC1_DEVID | 0x7191 |
| # Define PAC2_DEVID | 0x7194 |
| # Define M1541_DEVID | 0x1541 |
| # Define M1533_DEVID | 0x1533 |
| # Define M1621_DEVID | 0x1621 |
| # Define M1632_DEVID | 0x1632 |
| # Define M1535_DEVID | 0x1533 |
| # Define M1647_DEVID | 0x1647 |
| # Define VT8501_DEVID | 0x0501 |
| # Define VT686A_DEVID | 0x0686 |
| # Define VT8601_DEVID | 0x0601 |
| # Define VT8605_DEVID | 0x8605 |
| # Define VT8231_DEVID | 0x8231 |
| # Define VT8363_DEVID | 0x0305 |
| # Define SIS630_DEVID | 0x0630 |
| # Define SISLPC_DEVID | 0x0008 |
| # Define SIS540_DEVID | 0x0540 |
| # Define SIS961_DEVID | 0x0961 |
| # Define GMCH810_DEVID | 0x7120 |
| # Define GMCH810DC_DEVID | 0x7122 |
| # Define MCH820_AGP_DEVID | 0x250F |
| # Define MCH830_AGP_DEVID | 0x3578 |
| # Define ICH801AA_LPC_DEVID | 0x2410 |
| # Define Timna_DEVID | 0x1A10 |
| # Define Timna1_DEVID | 0x1A11 |
| # Define GMCH815_DEVID | 0x1130 |

FIG. 2

VERSATILE MEMORY CHIP PROGRAMMING DEVICE AND METHOD

BACKGROUND OF THE INVENTION

1. Field of the Invention

This invention relates to computer technology, and more particularly, to a versatile memory chip programming device and method capable of writing data by way of an arbitrary type of I/O control chip, such as Southbridge chip, into a memory chip, such as a BIOS (Basic Input/Output System) chip used in a personal computer (PC).

2. Description of Related Art

Southbridge chip is an I/O control chip developed by Intel and is widely utilized on computer motherboard for controlling data flow over PCI (Peripheral Component Interconnect) compliant buses connected between memory units and various other I/O devices such as IDE (Integrated Drive Electronics) compliant hard disk drivers, USB (Universal Serial Bus) compliant communication interfaces, serial ports, and so on.

BIOS (Basic Input/Output System) is a set of hardware-related system routines in a personal computer, which is stored in a nonvolatile memory chip, such as ROM (read-only memory) or flash memory, for providing an interface between the operating system and the PC's hardware components. Since PC technology advances very quickly, it is often required to upgrade the BIOS code in a PC so as to allow the PC to be compatible with newer hardware and software.

One conventional way to upgrade BIOS code in a PC is to replace the old BIOS chip with a new one. However, this practice is quite cost-ineffective since the old chip is discarded and a new chip is required. One cost-effective solution to this problem is to use a programmable memory chip to store the BIOS code so that when upgrade is needed, a programming device can be externally coupled to the BIOS chip (typically by way of a Southbridge chip) and then erase the old BIOS code in the memory chip and write the new version of BIOS code into the memory chip. One drawback to this solution, however, is that the programming device can only be coupled to a particular type of Southbridge chip and incompatible with other types of Southbridge chips. Although all Southbridge chips are based on the same architecture, different makes of Southbridge chips from different manufacturers are usually different in specification, which makes the programming device only compatible with one type of Southbridge chip. For this sake, when there are an assortment of different types of Southbridge chips, it requires the user to own a number of different types of programming devices to perform BIOS upgrades, which is apparently quite laborious and costly to implement.

SUMMARY OF THE INVENTION

It is therefore an objective of this invention to provide a versatile memory chip programming device and method that allows one unit of programming device to be compatible with various different types of Southbridge chips so that one single unit of programming device can be coupled to various types of Southbridge chips for BIOS upgrades.

It is another objective of this invention to provide a versatile memory chip programming device and method that allows BIOS upgrades to be more cost-effective to implement than prior art.

The memory chip programming device and method according to the invention is designed for use with an arbitrary type of I/O control chip (such as a Southbridge chip) coupled to a memory chip (such as a BIOS chip) for the purpose of writing data by way of the Southbridge chip into the memory chip.

In operation, the memory chip programming device of the invention first performs a chip type detecting procedure to detect the particular type of the I/O control chip being currently coupled; then performs a mapping procedure to retrieve the device driver and related settings from the database corresponding to the detected device type of the I/O control chip being currently coupled; subsequently performs a setting procedure to set a write control module to an operation mode based on the retrieved device driver and related settings from the database; and finally performing a write procedure to activate the write control module to write the data by way of the I/O control chip into the memory chip.

The memory chip programming device according to the invention is characterized by that the particular type of the Southbridge chip can be automatically detected to thereby set the write control module to operate in the corresponding mode that is compatible to the particular type of the Southbridge chip being currently coupled. This feature allows one single unit of memory chip programming device to be compatible to various types of Southbridge chips for BIOS upgrades so that BIOS upgrades can be made more cost-effective to implement than prior art.

BRIEF DESCRIPTION OF DRAWINGS

The invention can be more fully understood by reading the following detailed description of the preferred embodiments, with reference made to the accompanying drawings, wherein:

FIG. 2 is a table showing a set of device identification codes of a number of existing Southbridge chips.

DETAILED DESCRIPTION OF PREFERRED EMBODIMENTS

A preferred embodiment of the memory chip programming device and method according to the invention is disclosed in full details in the following with reference to the accompanying drawings.

Figure 1:
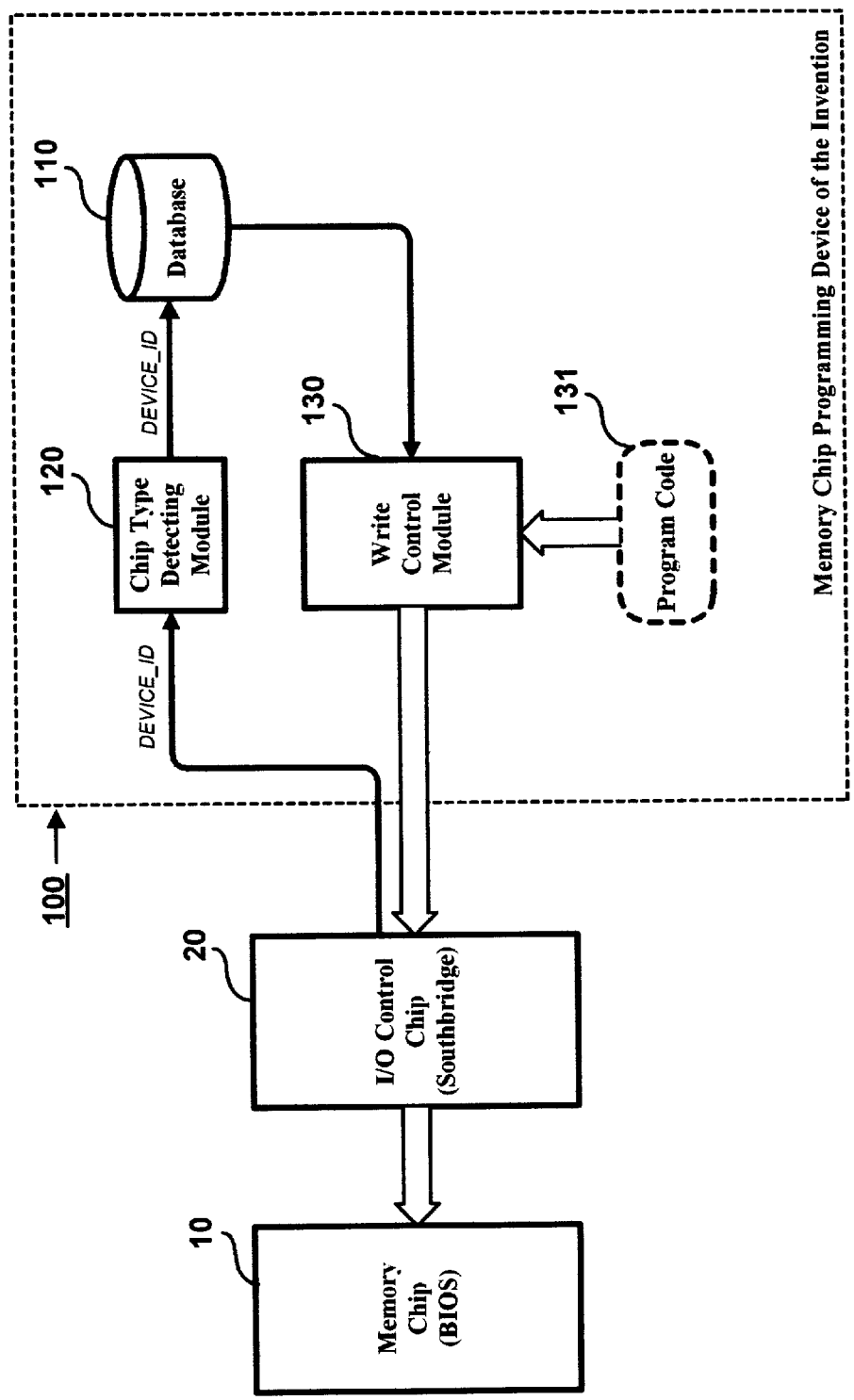
FIG. 1 is a schematic diagram showing the system architecture of the memory chip programming device according to the invention.

FIG. 1 is a schematic diagram showing the system architecture of the memory chip programming device according to the invention (as the part enclosed in the dotted box indicated by the reference numeral 100). In application, the memory chip programming device of the invention 100 is coupled to an I/O control chip, such as a Southbridge chip 20, for the purpose of writing program code by way of the Southbridge chip 20 into a programmable memory chip, such as a BIOS (Basic Input/Output System) chip 10 used in a personal computer (PC).

Fundamentally, the memory chip programming device of the invention 100 comprises: (a) a database 110; (b) a chip type detection module 120; and (c) a write control module 130.

The database 110 is used to prestore a set of device identification codes of a number of existing Southbridge chips and the respective drivers and related data of these Southbridge chips. The table of FIG. 2 shows an example of a set of device identification codes of some existing Southbridge chips currently available on the market, wherein each device identification code represents a particular type of Southbridge chip on the market.

Figure 3:
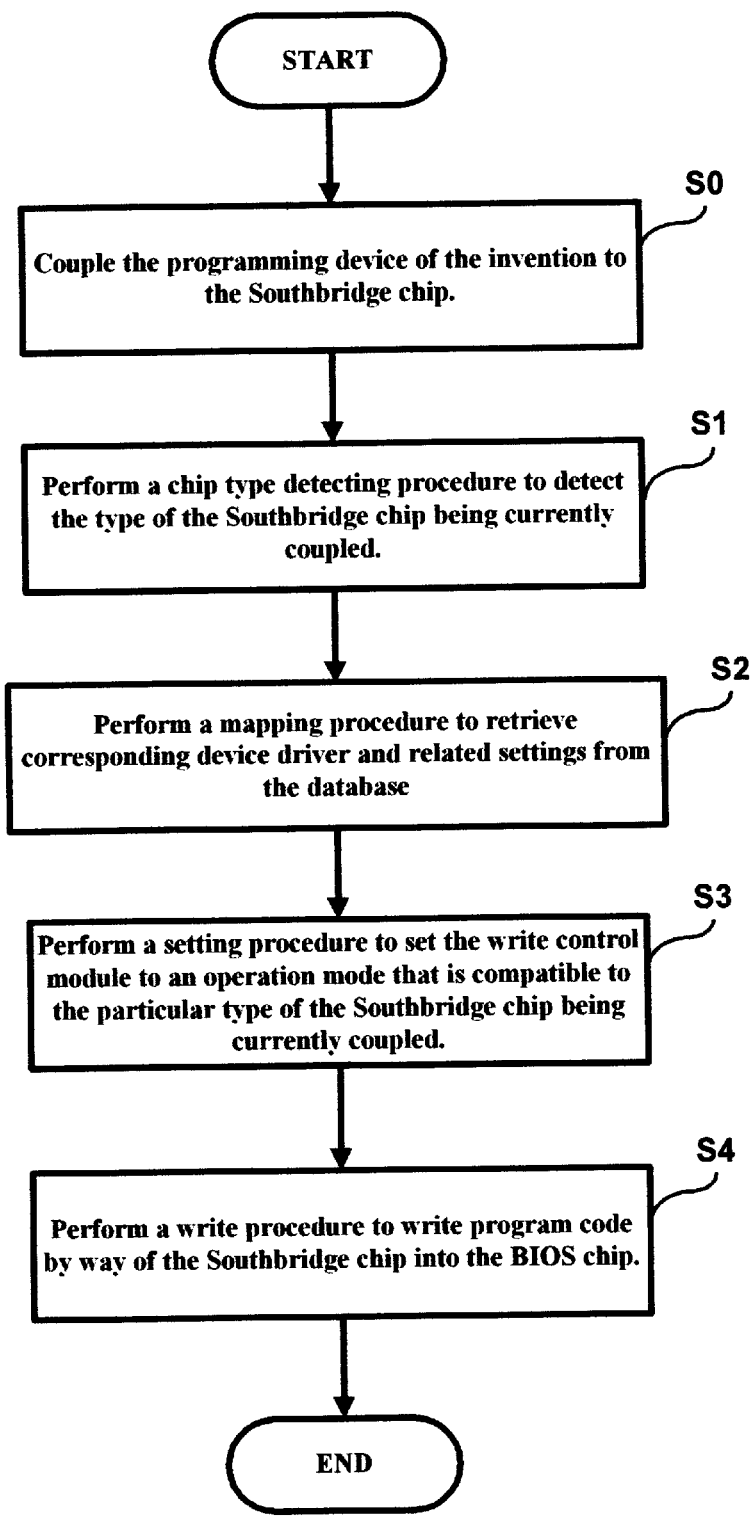
FIG. 3 is a flow diagram showing the operational procedures performed by the memory chip programming device according to the invention when writing data into a memory chip.

FIG. 3 is a flow diagram showing the operational procedures performed by the memory chip programming device of the invention 100 when writing data into the BIOS chip 10 by way of the Southbridge chip 20.

Referring to FIG. 2 together with FIG. 1, when the user wants to use the programming device of the invention 100 to write data into the BIOS chip 10, the first step S0 is to couple the programming device of the invention 100 to a Southbridge chip 20 coupled to the BIOS chip 10.

In the next step S1, a chip type detecting procedure is performed, wherein the chip type detection module 120 is activated to detect the type of the Southbridge chip 20 being currently coupled, i.e., to fetch the built-in device identification code (represented by Device_ID) embedded in the Southbridge chip 20. The detected device identification code Device_ID is then transferred to the database 110.

In the next step S2, a mapping procedure is performed, wherein the detected device identification code Device_ID is used by the database 110 as keyword to retrieve its corresponding device driver and related settings from the database 110.

In the next step S3, a setting procedure is performed, wherein the retrieved device driver and related settings from the database 110 are transferred to the write control module 130 so as to set the write control module 130 to an operation mode that is compatible to the particular type of the Southbridge chip 20 being currently coupled.

In the next step S4, a write procedure is performed, wherein the write control module 130 is activated to write a set of program code 131 by way of the Southbridge chip 20 into the BIOS chip 10 for the purpose of upgrading the BIOS chip 10. This completes the data write procedure by the memory chip programming device of the invention 100.

In conclusion, the invention provides a versatile memory chip programming device which is designed for use with an arbitrary type of I/O control chip (such as a Southbridge chip) coupled to a memory chip (such as a BIOS chip) for the purpose of writing data by way of the Southbridge chip into the memory chip, and which is characterized by that the particular type of the Southbridge chip can be automatically detected to thereby set the write control module to operate in the corresponding mode that is compatible to the particular type of the Southbridge chip being currently coupled. This feature allows one single unit of memory chip programming device to be compatible to various types of Southbridge chips for BIOS upgrades so that BIOS upgrades can be made more cost-effective to implement than prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for writing data by way of a particular type of I/O control chip into a memory chip, comprising the steps of:

building a database to store a set of device identification codes of a number of various types of I/O control chips and the respective drivers and related data of these I/O control chips;

performing a chip type detecting procedure to detect the particular type of the I/O control chip being currently coupled to the memory chip;

performing a mapping procedure to retrieve the device driver and related settings from the database corresponding to the detected device type of the I/O control chip being currently coupled to the memory chip;

performing a setting procedure to set a write control module to an operation mode based on the retrieved device driver and related settings from the database; and performing a write procedure to activate the write control module to write a set of data by way of the I/O control chip into the memory chip.

2. The memory chip programming method of claim 1, wherein the I/O control chip is a Southbridge chip.

3. The memory chip programming method of claim 1, wherein the memory chip is a BIOS chip.

4. A memory chip programming device for writing a set of data by way of a particular type of I/O control chip into a memory chip, comprising:

a database, which prestores a set of device identification codes of a number of various types of I/O control chips and the respective drivers and related data of these I/O control chips;

a chip type detection module, which is capable of detecting the particular type of the I/O control chip being currently coupled to the memory chip, and which is further capable of retrieving the device driver and related settings from the database corresponding to the detected device type of the I/O control chip being currently coupled to the memory chip;

a write control module, whose operation mode is capable of being set based on the retrieved device driver and related settings from the database to accordingly perform a write procedure to write data by way of the I/O control chip into the memory chip.

5. The memory chip programming device of claim 4, wherein the I/O control chip is a Southbridge chip.

6. The memory chip programming device of claim 4, wherein the memory chip is a BIOS chip.

7. A memory chip programming device for writing a set of data by way of a particular type of Southbridge chip into a memory chip, comprising:

a database, which prestores a set of device identification codes of a number of various types of Southbridge chips and the respective drivers and related data of these Southbridge chips;

a chip type detection module, which is capable of detecting the particular type of the Southbridge chip being currently coupled to the memory chip, and which is further capable of retrieving the device driver and related settings from the database corresponding to the detected device type of the Southbridge chip being currently coupled to the memory chip;

a write control module, whose operation mode is capable of being set based on the retrieved device driver and related settings from the database to accordingly perform a write procedure to write data by way of the Southbridge chip into the memory chip.

8. The memory chip programming device of claim 7, wherein the memory chip is a BIOS chip.

* * * * *